United States Patent
Cummings et al.

(12)

(10) Patent No.: US 12,026,699 B2
(45) Date of Patent: Jul. 2, 2024

(54) OFFLINE CRYPTO ASSET CUSTODIAN

(71) Applicant: Intercontinental Exchange Holdings, Inc., Atlanta, GA (US)

(72) Inventors: Raymond James Cummings, Decatur, GA (US); Larry Scheinberg, New York, NY (US); Yamini Sagar, Alpharetta, GA (US); Joseph W. Albert, Brookhaven, GA (US); Mayur Kapani, Marietta, GA (US); Charles Vice, Roswell, GA (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

(21) Appl. No.: 16/278,788

(22) Filed: Feb. 19, 2019

(65) Prior Publication Data

US 2019/0180273 A1    Jun. 13, 2019

Related U.S. Application Data

(60) Provisional application No. 62/632,754, filed on Feb. 20, 2018.

(51) Int. Cl.
 *G06Q 20/36* (2012.01)
 *G06Q 20/02* (2012.01)
 (Continued)

(52) U.S. Cl.
 CPC ......... *G06Q 20/3672* (2013.01); *G06Q 20/02* (2013.01); *G06Q 20/0655* (2013.01);
 (Continued)

(58) Field of Classification Search
 CPC ............. G06Q 20/3672; G06Q 20/389; G06Q 20/3678; G06Q 20/0655; G06Q 20/02; G06Q 2220/00
 See application file for complete search history.

(56) References Cited

U.S. PATENT DOCUMENTS 6,947,959 B1 * 9/2005 Gill ................. G06Q 10/10
 715/202
7,302,413 B1 * 11/2007 Bent ................ G06Q 20/10
 705/35

(Continued)

FOREIGN PATENT DOCUMENTS

| EP | 1 406 192 A1 | 4/2004 |
|----|---|---|
| KR | 10-2017-0056332 | 5/2017 |
| WO | 2017/115141 A1 | 7/2017 |

OTHER PUBLICATIONS

Hadyan, Wu et al., "A Distributed Ledger for Supply Chain Physical Distribution Visibility," Dec. 2, 2017, vol. 8, No. 4, p. 137, XP055580443.

(Continued)

*Primary Examiner* — Steven S Kim
(74) *Attorney, Agent, or Firm* — DLA Piper LLP (US)

(57) ABSTRACT

Systems and methods for secure digital asset transactions. An offline system includes a custodian computer, digital asset accounts accessible by the custodian computer and a centralized ledger maintained by the custodian computer. The custodian computer is in communication with public ledger computers of a public ledger, and receives transaction data associated with digital assets from among entity computers. Each account is prefunded with digital asset funds. The custodian computer monitors a transaction parameter of the transaction data and, in accordance with the monitoring, generates a transfer instruction indicating transfer of funds between the first and second accounts, updates the centralized ledger responsive to the transfer instruction, and transfers the funds between the first and second accounts, responsive to the transfer instruction. The transfer instruction remains offline and is not transferred to the public ledger.

13 Claims, 6 Drawing Sheets

(51) Int. Cl.
  *G06Q 20/06* (2012.01)
  *G06Q 20/38* (2012.01)
(52) U.S. Cl.
  CPC ....... *G06Q 20/3678* (2013.01); *G06Q 20/389* (2013.01); *G06Q 2220/00* (2013.01)

(56) References Cited

U.S. PATENT DOCUMENTS

| | | | | |
|---|---|---|---|---|
| 7,398,245 | B1* | 7/2008 | Bent | G06Q 40/00 705/35 |
| 9,672,499 | B2* | 6/2017 | Yang | G06Q 20/3678 |
| 11,361,316 | B2* | 6/2022 | Collin | H04L 9/3239 |
| 2005/0075900 | A1* | 4/2005 | Arguimbau, III | G06Q 10/0637 426/87 |
| 2010/0049647 | A1* | 2/2010 | De Chabris | G06Q 40/04 705/37 |
| 2015/0046337 | A1* | 2/2015 | Hu | G06Q 20/0658 705/65 |
| 2015/0170112 | A1* | 6/2015 | DeCastro | G06Q 20/381 705/39 |
| 2015/0206106 | A1* | 7/2015 | Yago | G06Q 20/0655 705/68 |
| 2015/0262137 | A1* | 9/2015 | Armstrong | G06Q 20/40 705/41 |
| 2015/0262176 | A1* | 9/2015 | Langschaedel | G06Q 20/0658 705/71 |
| 2015/0332256 | A1* | 11/2015 | Minor | G06Q 20/381 705/69 |
| 2015/0332283 | A1* | 11/2015 | Witchey | G06F 21/00 705/3 |
| 2016/0012424 | A1* | 1/2016 | Simon | G06Q 20/3674 705/67 |
| 2016/0224977 | A1* | 8/2016 | Sabba | G06Q 20/385 |
| 2016/0253663 | A1* | 9/2016 | Clark | G06Q 20/02 705/75 |
| 2016/0335628 | A1* | 11/2016 | Weigold | G06Q 20/065 |
| 2017/0046526 | A1* | 2/2017 | Chan | G06Q 20/0655 |
| 2017/0046698 | A1* | 2/2017 | Haldenby | G06Q 20/0655 |
| 2017/0124556 | A1* | 5/2017 | Seger, II | G06Q 20/3829 |
| 2017/0124647 | A1* | 5/2017 | Pierce | G06Q 40/04 |
| 2017/0124667 | A1* | 5/2017 | Ho | G01R 22/063 |
| 2017/0132615 | A1* | 5/2017 | Castinado | G06Q 20/4014 |
| 2017/0132626 | A1* | 5/2017 | Kennedy | G06Q 20/065 |
| 2017/0134280 | A1* | 5/2017 | Davis | G06Q 20/10 |
| 2017/0177898 | A1* | 6/2017 | Dillenberger | G06F 16/2379 |
| 2017/0193619 | A1* | 7/2017 | Rollins | G06Q 50/184 |
| 2017/0221022 | A1* | 8/2017 | Goloshchuk | G06Q 20/0855 |
| 2017/0228704 | A1 | 8/2017 | Zhou et al. | |
| 2017/0230375 | A1* | 8/2017 | Kurian | H04L 63/102 |
| 2017/0243214 | A1* | 8/2017 | Johnsrud | G06Q 20/401 |
| 2017/0300912 | A1* | 10/2017 | Narasimhan | G06Q 20/4014 |
| 2017/0330159 | A1* | 11/2017 | Castinado | G06Q 20/02 |
| 2017/0330174 | A1* | 11/2017 | Demarinis | G06Q 40/04 |
| 2017/0331810 | A1* | 11/2017 | Kurian | H04L 63/083 |
| 2017/0331896 | A1* | 11/2017 | Holloway | H04L 67/12 |
| 2017/0372417 | A1* | 12/2017 | Gaddam | G06Q 20/065 |
| 2018/0012311 | A1* | 1/2018 | Small | B33Y 50/02 |
| 2018/0025435 | A1* | 1/2018 | Karame | G06Q 40/12 705/30 |
| 2018/0101701 | A1* | 4/2018 | Barinov | H04L 63/12 |
| 2018/0115428 | A1* | 4/2018 | Lysenko | H04L 63/123 |
| 2018/0189781 | A1* | 7/2018 | McCann | G06Q 20/382 |
| 2018/0204190 | A1* | 7/2018 | Moy | G06Q 20/401 |
| 2018/0211322 | A1* | 7/2018 | Lintner | G06Q 20/401 |
| 2018/0225660 | A1* | 8/2018 | Chapman | G06Q 20/065 |
| 2018/0240086 | A1* | 8/2018 | Sobotka | G06Q 20/06 |
| 2018/0260795 | A1* | 9/2018 | Maenpaa | G06Q 20/0658 |
| 2018/0373770 | A1* | 12/2018 | Switzer | G06F 16/901 |
| 2019/0034663 | A1* | 1/2019 | Katikala | H04L 9/3239 |
| 2019/0034923 | A1* | 1/2019 | Greco | H04L 9/3239 |
| 2019/0080407 | A1* | 3/2019 | Molinari | H04L 9/3239 |
| 2019/0104196 | A1* | 4/2019 | Li | G06F 16/2379 |

OTHER PUBLICATIONS

European Search Report dated Apr. 24, 2019, of counterpart European Application No. 19158323.6.
European Search Report dated Dec. 9, 2020, of counterpart European Application No. 19 158 323.6.
Singapore Office Action dated May 24, 2022 in counterpart Singapore Patent Application No. 10201901461X.

* cited by examiner

OFFLINE CRYPTO ASSET CUSTODIAN

TECHNICAL FIELD

The present disclosure generally relates to crypto assets and, more particularly, to systems and methods for secure crypto asset transactions to minimize security risks including crypto asset hacking.

BACKGROUND

A crypto asset, in general, is a digital asset that uses cryptography to secure transactions, control the creation of new units of currency and verify the transfer of digital assets. Crypto assets (e.g., bitcoin, altcoin) represents a type of virtual currency that uses decentralized control, through a blockchain. A blockchain may be managed by a peer-to-peer network, and represents a public transaction database that functions as a distributed (public) ledger, and which ensures the validity of the transactions. For purposes of this disclosure, decentralized virtual currency refers to currency that has no central repository/no single administrator and which is outside the control of governments and central banks.

Conventionally, crypto asset 'wallets' are used to receive and/or spend crypto assets. The wallets may store public and private key pairs (also known as addresses). In general, the private key is known only to the owner, whereas the public key may be widely disseminated. The private key may be used to write in the public ledger, thereby spending the crypto assets. The public key may be used by others to transfer crypto assets to the wallet. Thus, the public/private key pair are needed to effectuate such transactions. The crypto asset may itself remain de-centrally stored and maintained in the public ledger. Because of the private/public key pairs, in crypto asset transactions, it is possible that crypto asset owners may not be identifiable, even though all transactions are publically available in the blockchain.

Online crypto asset wallets (e.g., mobile wallets, desktop wallets, web wallets), however, are prone to security risks. For example, a wallet may be hacked, leading to the theft of sensitive account information, private keys, and/or crypto assets. Some common vulnerabilities of wallets include insecure data storage and insufficient cryptography. For example, insecure data storage may cause leakage of private infoiniation. Insufficient cryptography may fail to adequately shield the underlying information in the wallet. The stolen wallet information may be used to move the owner's crypto assets on the public ledger, for example, to another user's public key (destination address). Once the crypto assets are moved on the public ledger, it may be impossible to retrieve the stolen crypto assets.

Accordingly, there is a need for improved systems and security techniques for executing transactions based on cryptocurrencies without relying on crypto asset wallets, to minimize security risks including hacking.

SUMMARY

Aspects of the present disclosure relate to an offline custodian and methods for secure digital asset transactions. An offline custodian system includes a custodian computer, a plurality of digital asset accounts and a centralized ledger. The custodian computer is in electronic communication with one or more public ledger computers associated with at least one public ledger via one or more electronic networks. The custodian computer is configured to receive transaction data from among a plurality of entity computers. The transaction data is associated with one or more digital assets. The plurality of digital asset accounts are stored in the offline custodian system and are accessible by the custodian computer. Each digital asset account corresponds to at least one of the plurality of entity computers. Each digital asset account is prefunded with digital asset funds. The centralized ledger is maintained by and has access controlled by the custodian computer. The custodian computer is configured to monitor at least one transaction parameter associated with the received transaction data. The custodian computer, in accordance with the monitoring: generates a transfer instruction indicating a transfer of a portion of digital asset funds from at least one first digital asset account to at least one second digital asset account from among the plurality of digital asset accounts, updates the centralized ledger, responsive to the transfer instruction, to indicate the transfer of the portion of digital asset funds, and transfers the portion of digital asset funds between the at least one first digital asset account and the at least one second digital asset account among the plurality of digital asset accounts responsive to the transfer instruction. The transfer instruction remains offline and is not transferred to the at least one public ledger.

DETAILED DESCRIPTION

Aspects of the present disclosure relate to a novel system architecture that implements an offline crypto asset custodian system(s) and methods for wallet-less transactions involving cryptocurrencies. In an example embodiment, the transactions may include cleared transactions of crypto asset futures contracts. The (offline) custodian system may interface with public ledger systems (e.g., blockchain systems), electronic exchanges and clearinghouses. However, it should be clear that the offline custodian system of the present disclosure is not itself a public ledger system. Through its various interfaces, the custodian system may be used to securely store the cryptocurrencies (offline), which may then be physically delivered according to the transactions (on the electronic exchanges) involving crypto asset futures contracts, for example. In general, the transactions may include transactions where crypto assets represents the commodity being traded and transactions (with crypto assets) involving any other commodity (e.g., oil).

As discussed above, crypto asset transactions between public wallets are prone to security risks, such as hacking. Exemplary offline crypto asset custodian systems and methods of the present disclosure create a closed transaction system that is offline (e.g., separate and apart from public ledger systems) and secure from public transactions. As a condition for participation in crypto asset-based transactions, users of the custodian system may need to prove that they have title and possession of crypto asset(s) (e.g., cryptocurrency) before they are able to participate in transactions internally within an electronic exchange system. As part of the possession validation, users may transfer crypto asset(s) into the custodian system, such that the custodian system has physical possession of the crypto asset(s) prior to granting permission to the user to participate in transactions. Because users provide the custodian system with physical possession of the crypto asset(s) prior to initiating and/or participating in any transactions (internally within the electronic exchange system), the custodian system may ensure that users do not overdraw their accounts and guarantee physical delivery (e.g., full payment) during a settlement process. In other words, the custodian system may ensure that each account is prefunded with digital assets (e.g., crypto assets) before users may participate in transactions, and those transactions will be limited in value to the amounts that the users have prefunded.

Example custodian systems of the present disclosure may also maintain a centralized (offline) ledger for keeping track of ownership of (and/or transactions involving) crypto assets, for example, as part of an electronic exchange system. The centralized ledger may be configured to be offline and inaccessible to or by public ledgers. Crypto assets transferred into the custodian system may be retitled to a custodian entity designating a user as the beneficiary of the transferred crypto asset(s). Thus, all crypto assets stored within the custodian system may be titled to the custodian entity. The custodian system may also store crypto assets in an offline secure storage, such that the assets may be inaccessible to external sources, thereby preventing information leakage and hacking. Moreover, all transactions (internally) within the custodian system may be performed without any public crypto asset wallets, and information regarding transactions between counterparties of the electronic exchange system may remain within the electronic exchange system, through the custodian system.

In some examples, the custodian system may communicate with external accounts (such as public wallets) to transfer crypto assets into secure accounts that are stored within the custodian system (i.e., offline secure accounts) or out of the offline secure accounts (and out of the custodian system) into public wallet accounts, for example. In some examples, the custodian system may include a public-facing wallet for temporarily storing crypto assets (during a pending transfer), and for transfer of crypto assets between the custodian system and public accounts. Any crypto assets held during a pending deposit may immediately be transferred from the public wallet to the offline secure storage to reduce any security risks.

Figure 1:
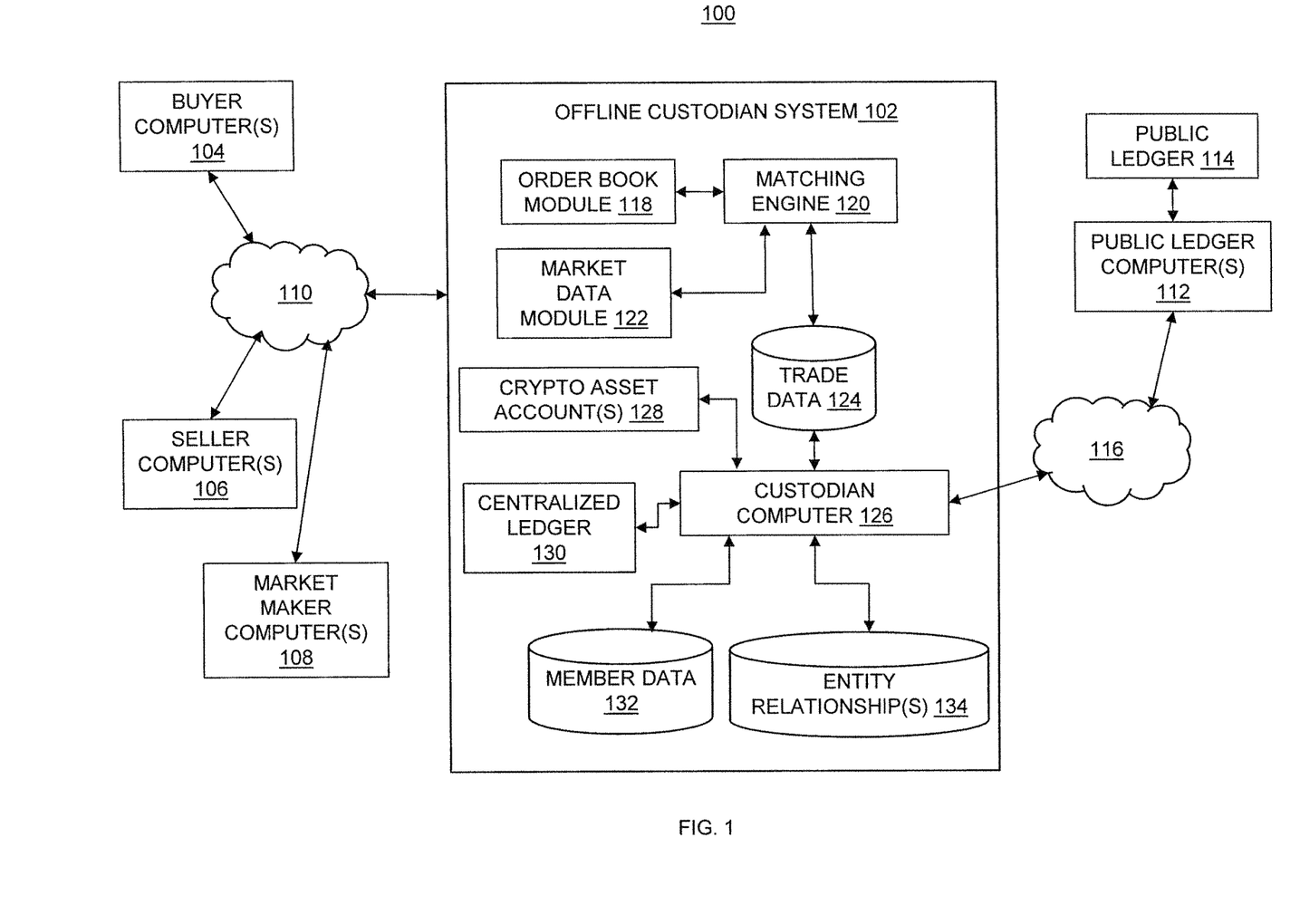
FIG. 1 is a functional block diagram of an example data structure management environment for wallet-less transactions involving cryptocurrencies, according to an aspect of the present disclosure.

Referring to FIG. 1, FIG. 1 is a functional block diagram of an example data structure management environment 100 for wallet-less futures transactions involving cryptocurrencies, according to aspects of the present disclosure. Environment 100 may include offline custodian system 102 (also referred to herein as system 102), one or more buyer computers 104, one or more seller computers 106, one or more market maker (MM) computers 108, and one or more public ledger computers 112. Public ledger computer(s) 112 may maintain a publically viewable ledger 114 that lists crypto asset transfers. System 102 may be configured to communicate with public ledger computer(s) 112, for example, to indicate crypto asset transfers within centralized ledger 130, in order to update public ledger 114. System 102 may also transfer crypto assets associated with seller computer(s) 106 to crypto asset (CA) account(s) 128 (e.g., from a seller's wallet that is associated with public ledger 114), prior to permitting seller computer(s) 106 to initiate transactions with system 102. In some examples, system 102 may communicate with public ledger computer(s) 112 when crypto assets is transferred into CA account(s) 128, to update public ledger 114 with any change in title of the transferred crypto assets. Buyer computer(s) 104, seller computer(s) 106 and MM computer(s) 108 may communicate with system 102 for initiating transactions including, in one example, crypto asset futures (CAF) transactions.

In system 102, CA account(s) 128 represent an offline and secure data repository for storing crypto assets for registered members of system 102, for minimizing security risks such as hacking and information leakage. In some examples, centralized ledger 130 may also represent an offline component that may not be connected to an external network. For example, centralized ledger 130 may be directly coupled to custodian computer 126, but centralized ledger 130 may not be coupled to external network 116 (and, in some examples, network 110). In this manner, centralized ledger 130 may be disconnected from public ledger computer(s) 112 and, thus, offline. In some examples, custodian computer 126 may be configured to only communicate with public ledger 114 (via public ledger computer(s) 112) during transfer of crypto assets between a member's public wallet (e.g., member public wallet(s) 220 shown in FIG. 2) and offline CA account(s) 128 of system 102. In other words, custodian computer 126 may communicate with public ledger 114 during a deposit of crypto asset funds into CA account(s) 128 from a public wallet of a registered member of system 102 (e.g., member public wallet(s) 220), and during a withdrawal of crypto asset funds from CA account(s) 128 into the member's public wallet 220. During such transfers, custodian computer 126 may access public ledger 114 in order to retitle the transferred assets. For example, during a deposit into CA account(s) 128, custodian computer 126 may retitle the assets in the name of a custodian entity. During a withdrawal, custodian computer 126 may retitle the assets in the name of the member. All other internal transactions within system 102 (i.e., amongst and between offline CA account(s) 128) may be performed internally and offline (e.g., without any communication with (external) public ledger 114 and/or public ledger computer(s) 112.

Buyer computer(s) 104, seller computer(s) 106 and MM computer(s) 108 may be communicatively coupled to system 102 via one or more communication networks 110. System 102 may be communicatively coupled to one or more of public ledger computer(s) 112 via one or more computer networks 116. Each of networks 110, 116 may include, for example, a private network (e.g., a local area network (LAN), a wide area network (WAN), intranet, etc.) and/or a public network (e.g., the Internet). In some examples, network 110 may be different from network 116. In some examples, network 110 and network 116 may represent a same network. In some examples, one or more of computers 104-108 may be directly connected to system 102.

Computers 104-108 may be configured to transmit electronic messages directed to system 102. System 102 may similarly transmit electronic messages directed to one or more of computers 104-108. Buyer computer(s) 104 and seller computer(s) 106 may represent market participants for participating in transactions via system 102. Market maker computer(s) 108 may represent any suitable broker and/or dealer for maintaining an electronic market. Electronic messages from computers 104-108 may include, for example, order data (e.g., bid and/or offer data) for one or more digital assets and identification data of the respective users. Electronic messages from system 102 may include, for example, market data information, transaction information, etc.

Each of computers 104-108 may comprise a desktop computer, a laptop, a smartphone, tablet, or any other user device known in the art. A user may interact with buyer computer 104, for example, via a graphical user interface (not shown) displayed on any type of display device including a computer monitor, a smart-phone screen, tablet, a laptop screen or any other device providing information to a participant. Computers 104-108 may include any suitable user interface, user input component(s), output component(s), and communication component(s) for creation and transmission and receipt of electronic messages. The electronic messages may include, without being limited to, instant messages, personal messages, text messages and email.

System 102 may include an order book module 118, matching engine 120, market data module 122, trade data storage 124, custodian computer 126, CA accounts 128, centralized ledger 130, member data storage 132 and entity relationship storage 134. Collectively, order book module 118, matching engine 120 and market data module 122 may represent an electronic exchange and clearinghouse configured to support trading and clearing of CAF transactions involving buyer computer(s) 104, seller computer(s) 106 and MM computer(s) 108.

System 102 may receive order data (e.g., via electronic messages) from among computers 104-108, and may store the received order data in one or more order books (not shown) of order book module 118. Order book module 118 may be configured to determine current bid and offer prices based on the received order data in the order books. Order book module 118 may be communicatively coupled to matching engine 120, and may transmit the current prices to matching engine 120.

Matching engine 120 may match one or more orders in the order book(s) based on the current bid/offer prices determined by order book module 118, to generate one or more trades from the matched orders. Matching engine 120 may store the generated trades in storage 124. Matching engine 120 may also cause order book module 118 to update the order book(s), to remove the matched orders associated with the generated trades (stored in storage 124). Trade data storage 124 may include any electronic storage device configured to store electronic trade data (e.g., matched orders representing trades (transactions)).

Market data module 122 may be configured to collect market data from one or more external data sources (not shown). The market data may include live and/or historical market data. In some examples, matching engine 120 may use the collected market data to match order(s) within the system 102. For example, matching engine 120 may use current market data to allow or prevent particular orders from being matched.

System 102 may be configured to transmit the market data, collected by market data module 112, as well as any data related to orders (stored in the order book(s) and/or trades stored in storage 124) to one or more computers among computer(s) 104-108. System 102 may provide the market/order/trade data to computer(s) 104-108, for example, upon request, periodically, under one or more particular conditions and/or at one or more particular times.

In system 102, members (e.g., users of buyer computer(s) 104, users of seller computer(s) 106, users of MM computer(s) 108) may be associated with respective CA account(s) 128. Members may be defined as registered users of system 102 that are permitted by system 102 to initiate and participate in crypto asset transactions. (The registration and permissioning is described further below with respect to custodian computer 126.) Each CA account 128 may be associated with a particular member, and may store indications of crypto assets specific to the particular member. The indications of crypto assets, in CA accounts 128, may represent physical commodities. In operation, CA accounts 128 may be used, in some examples, to facilitate physical delivery of CAF contracts among the members. In general, CA account(s) 128 may represent custodian entity-managed accounts which may track crypto asset ownership of members (such as, for example, clearing members, (registered) customers).

Figure 2:
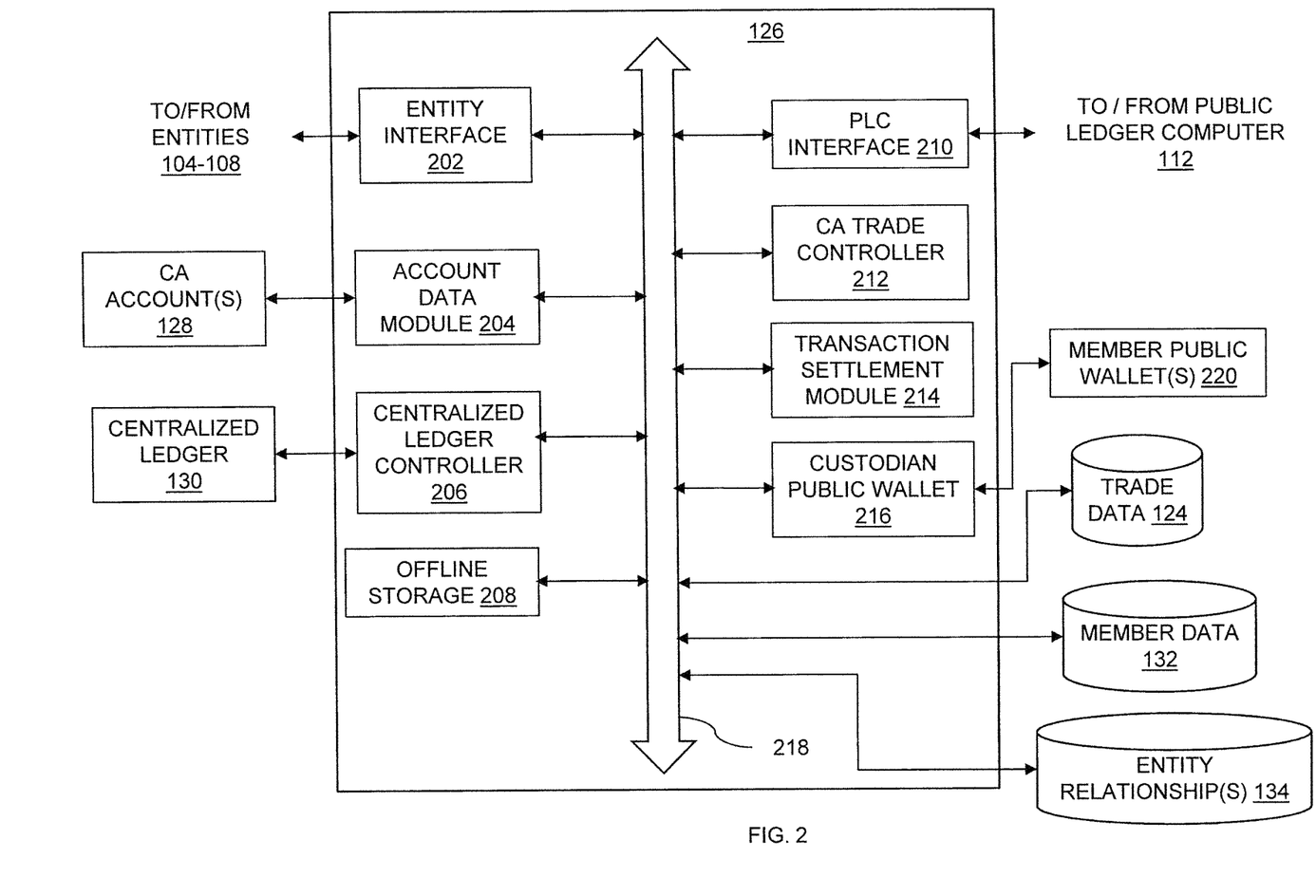
FIG. 2 is a functional block diagram of an example custodian computer associated with the data structure management environment shown in FIG. 1, according to an aspect of the present disclosure.

CA account(s) 128 may be stored, for example, in one or more databases. CA account(s) 128 may also be stored in a secure manner, to prevent tampering with and/or leakage of the account information. In some examples, CA accounts 128 may be stored in offline secure storage, such as offline storage 208 (FIG. 2). In this manner, system 102 may reduce security risks in the storage of account information itself.

System 102 further stores member data in storage 132. The member data may include information identifying each member permitted to initiate and participate in transactions with system 102. The member data may include, for example, member identify information, computer identity information (e.g., an internet protocol (IP) address, hypertext transfer protocol (HTTP) cookies, etc.), and the like. The member data may also include infot mation linking the member to a particular CA account 128. In general, the member data may include any member identity information to track ownership of crypto assets in system 102.

System 102 may further store one or more entity relationships in storage 134. The entity relationships may include any existing relationships and/or legal framework between the members and system 102. The entity relationships may be used by system 102 for updating CA accounts, thereby eliminating the need for any crypto asset wallets for conducting transactions. Because of the existence of the entity relationships, all shares of the digital asset may be tracked, including shares to brokers and/or dealers (e.g., market makers).

In some examples, member data, entity relationships and CA account information may be stored in an encrypted format, to prevent unauthorized access to member, entity and CA account information. In some examples, member data and entity relationships may be stored in offline secure storage. Although FIG. 1 illustrates member data and entity relationship(s) as being stored in separate storage 132 and 134, in some examples, the member data and entity relationship(s) may be stored in a same storage (e.g., a same database).

Centralized ledger 130 represents an offline centralized repository controlled and updated by custodian computer 112. Centralized ledger 130 may be configured to indicate timestamped records of each CA transaction (including, in some examples, CAF transactions) in system 102 (for example, based on trade data in storage 124). In some examples, clearing members (not shown) may keep their own ledgers (not shown). The combination of centralized ledger 130 and market maker ledgers may be used to track and verify shares of digital assets across environment 100.

The combination of CA accounts 128, centralized ledger 130, member data and entity relationships (as controlled by custodian computer 126) represents a wallet-less and offline crypto asset management and transfer system. Because the management/transfer system is wallet-less and offline, system 102 minimizes security risks such as hacking.

System 102 may also include custodian computer 126 configured to implement functions of registering and permissioning members for CA transactions with system 102, maintaining centralized ledger 130, storing crypto assets offline in CA accounts 128, facilitating physical delivery (e.g., payment using crypto assets) of CAF transactions (for example) via CA accounts 128 and controlling transfer of crypto assets from public ledger 114. Custodian computer 126 is described further below with respect to FIG. 2. In the examples below, system 102 is described with respect to CAF transactions. However, it is understood that system 102, including custodian computer 126, may be configured to control processing of any suitable CA transaction (including but not being limited to CAF transactions).

System 102, because of its architecture (including the arrangement and configuration of custodian computer 126 together with CA accounts 128 and centralized ledger 130), centrally stores and maintains offline CA accounts, and maintains its own centralized ledger 130 that tracks transactions within system 102. Moreover, system 102 monitors funds within each CA account 128, requires users to physically deliver crypto asset funds to CA account(s) 128 of system 102 (i.e., prefund the CA account(s)) before the users are permitted to initiate trades, generates transactions according to the available funds (through the monitoring) in the respective CA accounts 128, and transfers funds (at delivery) within CA accounts 128 maintained by system 102 itself. Accordingly, system 102 represents an offline custodian system (which may be part of an electronic exchange system). And, in this manner, the process by which system 102 guarantees physical delivery represents a new model for trading futures contracts.

In some examples, order book module 118, matching engine 120 and market data module 122 may be embodied on a single computing device. In other examples, order book module 118, matching engine 120 and market data module 122 may refer to two or more computing devices distributed over several physical locations, connected by one or more wired and/or wireless links. In some examples, order book module 118, matching engine 120, market data module 122 and custodian computer 126 may be embodied on a single computing device. In other examples, order book module 118, matching engine 120, market data module 122 and custodian computer 126 may refer to two or more computing devices distributed over several physical locations. It should be understood that system 102 refers to a computing system having sufficient processing and memory capabilities to perform the specialized functions described herein.

Referring next to FIG. 2, FIG. 2 is a functional block diagram of example custodian computer 126, according to aspects of the present disclosure. Custodian computer 126 may include entity interface 202, account data module 204, centralized ledger controller 206, offline storage 208, public ledger computer (PLC) interface 210, crypto asset (CA) trade controller 212, transaction settlement module 214, and custodian public wallet 216, which may communicate with each other via data and control bus 218. Although FIG. 2 illustrates CA account(s) 128, centralized ledger 130, trade data storage 124, member data storage 132 and entity relationship(s) storage 134 being separate from custodian computer 126, in some examples, one or more of components 124 and 128-132 may be part of custodian computer 126.

Entity interface 202 may represent any electronic device including hardware circuitry or application on an electronic device configured to receive incoming messages from various entities (e.g., buyer computer(s) 104, seller computer(s) 106, MM computer(s) 108) via network 110. In some examples, custodian computer 126 may transmit information and/or data to various entities. In some examples, entity interface 202 may be configured to securely communicate with one or more of the entities.

Account data module 204 may be configured to register and permission new requesting entities (as members). The registration by account data module 204 may include creating a specific CA account 128 for the requesting entity, updating storage 132 with member information for the entity, and updating storage 134 with new entity relationship(s) associated with the entity. The permissioning by account data module 204 may include transferring crypto assets from one or more crypto asset accounts (e.g., a public crypto asset wallet) of the entity to newly created CA account 128. In some examples, the permissioning may include transferring crypto assets to CA account 128 by way of a crypto asset fund transfer from the entity's public wallet (e.g., member public wallet(s) 220) to custodian public wallet 216 (described further below). In some examples, the permissioning may further include communicating with public ledger computer(s) 112 (through PLC interface 210) to update public ledger 114 to indicate the transferred crypto assets (e.g., if custodian computer 126 transfers the title of the crypto assets from the entity to a custodian entity). In an example, an entity may not be eligible to participate in transactions unless there is actual delivery of crypto assets into CA account 128 (through the permissioning by account data module 204). An example registration and permissioning process performed by account data module 204 is described further below with respect to FIG. 3.

Figure 3:
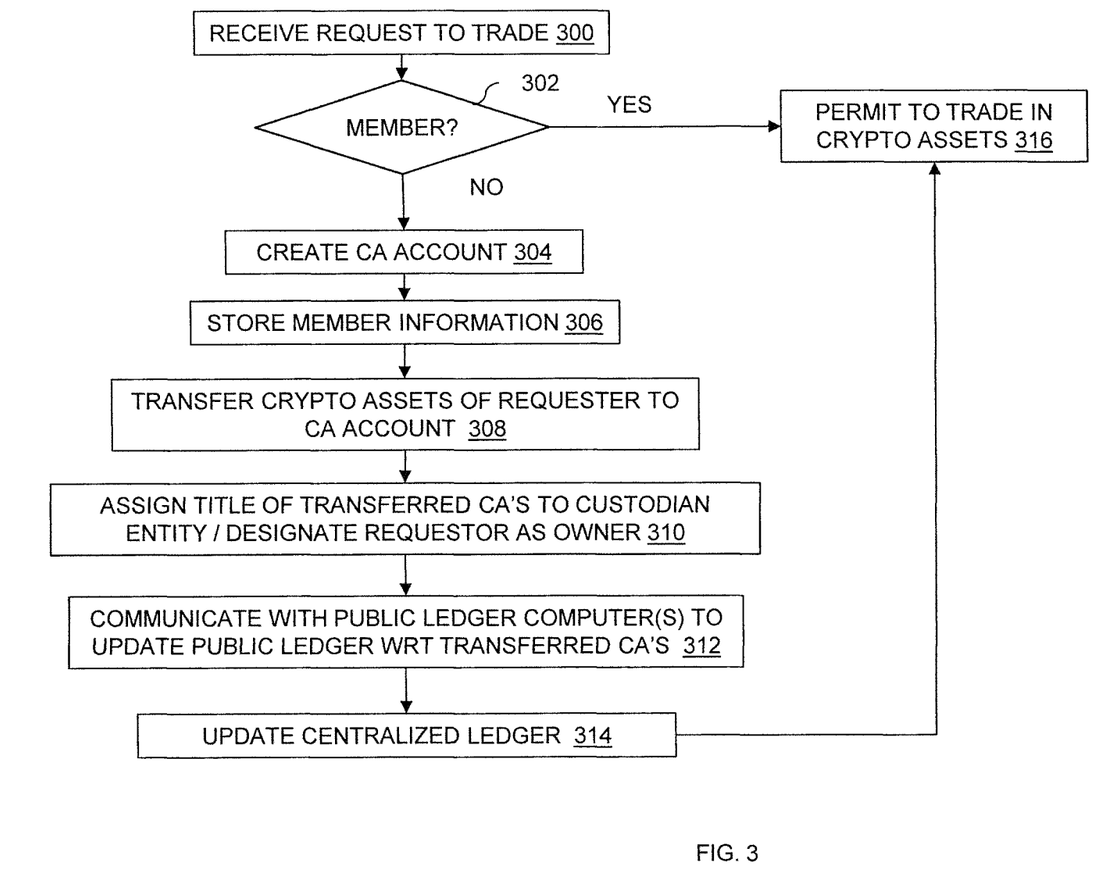
FIG. 3 is a flowchart diagram of an example method for registering and permissioning an entity, and depositing crypto asset funds, associated with the data structure management environment shown in FIG. 1, according to an aspect of the present disclosure.
Figure 5:
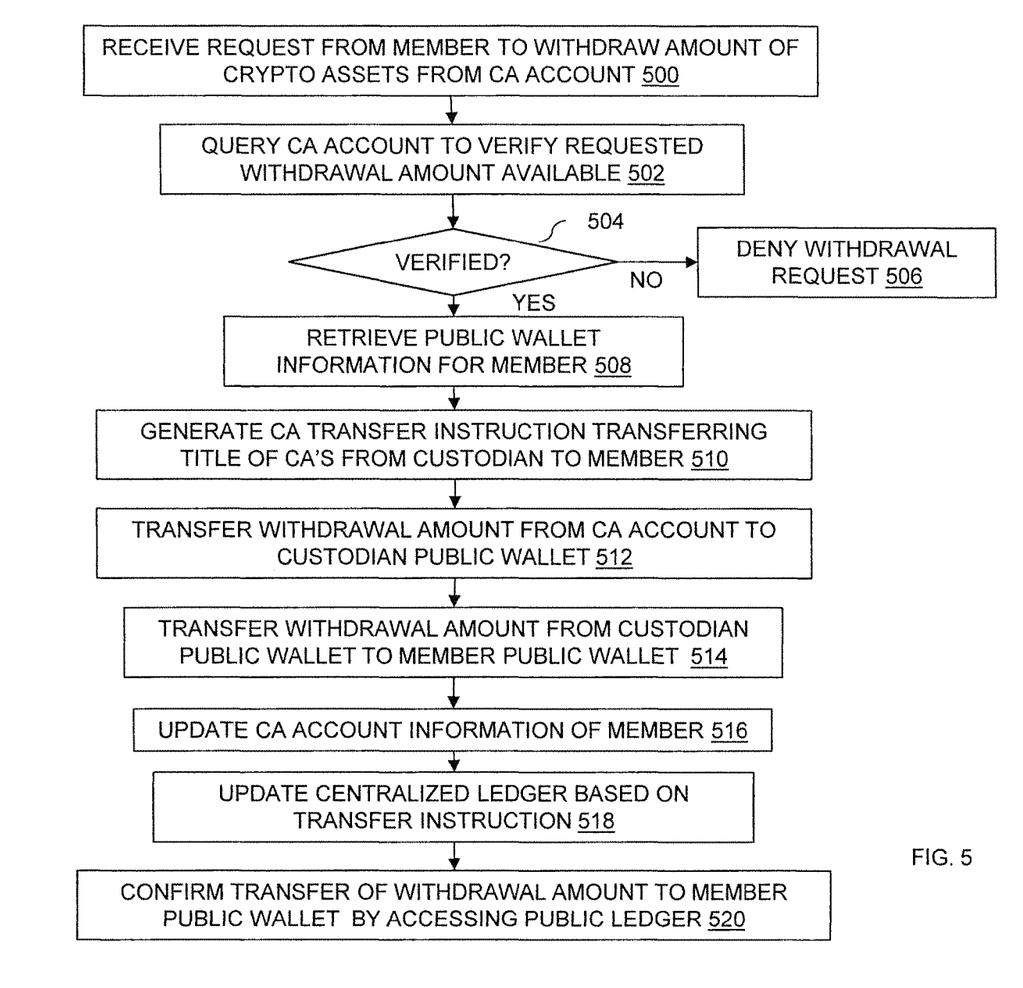
FIG. 5 is a flowchart diagram of an example method for withdrawal of crypto asset funds from a system account to a public account, associated with the data structure management environment shown in FIG. 1, according to an aspect of the present disclosure.

In some examples, account data module 204 may access CA account(s) 128 via offline storage 208. In some examples, account data module 204 may be configured to transfer crypto asset funds between (internal and offline) CA accounts) 128 and (external) public member crypto asset accounts. The transfer of crypto asset funds may include deposits into CA account(s) 128 and withdrawals from CA account(s) 128. In some examples, the transfer of crypto asset funds may include a transfer of title of the crypto asset funds between a custodian entity and the member. An example of a deposit is shown in FIG. 3. An example of a withdrawal is shown in FIG. 5. In some examples, account data module 204 may operate with offline storage 208, custodian public wallet 216 and member public wallet 220 in order to transfer the crypto asset funds. For example, in a deposit, funds may be transferred from member public wallet 220 to custodian public wallet 216, and then immediately transferred from custodian public wallet 216 to offline storage 208 (to minimize security risks). In a withdrawal, funds may be transferred from offline storage 208 to custodian public wallet 216, and then immediately transferred to member public wallet 220.

Centralized ledger controller 206 (also referred to herein as CL controller 206) may be configured to maintain and update centralized ledger 130 in response to transactions in trade data storage 124 and settling contracts based on crypto assets, such as CAF contracts. In some examples, CL controller 206 may operate in combination with transaction settlement module 214 (described further below) and account data module 204 to update centralized ledger 130 for transfer of crypto assets during a settlement process. CL controller 206 may include, for example, a processor, a microcontroller, a circuit, software and/or other hardware component(s) specially configured to perform the operations described herein.

Offline storage 208 may represent any electronic storage device configured to store CA account(s) 128 (and, in some examples, one or more of member data and entity relationship(s)) digitally in cold storage and in a secure manner, such that crypto asset funds of members of system 102 are offline (e.g., inaccessible via networks 110, 116). Accordingly, by storing crypto asset information in offline storage 208, hacking of crypto assets may be prevented.

PLC interface 210 may represent any electronic device including hardware circuitry or application on an electronic device configured to communicate with public ledger computer(s) 112, for updating public ledger 114 with any internal (i.e., within system 102) crypto asset transfers into CA account(s) 128 and, in some examples, any crypto asset withdrawals from CA account(s) 128 into external entity accounts (not shown). In some examples, PLC interface 210 may be configured to securely communicate with public ledger computer(s) 112. In some examples, PLC interface 210 may also support the transfer (i.e., a deposit) of crypto assets from an entity's external account (e.g., a wallet) into CA account(s) 128. In some examples, PLC interface 210 may also support the transfer (i.e., a withdrawal) of crypto assets into an entity's external account (e.g., a wallet) from CA account(s) 128.

CA trade controller 212 may include, for example, a processor, a microcontroller, a circuit, software and/or other hardware component(s) specially configured to control operation of entity interface 202, account data module 204, centralized ledger controller 206, offline storage 208, PLC interface 210, transaction settlement module 214, and custodian public wallet 216, including for operations relating to registering and permissioning entities (requesting to perforin transactions), transferring crypto asset funds into and out of system 102, and transaction settlement at the time of contract expiration.

Transaction settlement module 214 may be configured to monitor expiration of contracts associated with transactions, and control settlement of transactions. Transaction settlement module 214 controls settlement through the transfer of crypto assets between counterparty accounts, internally within system 102, via CA accounts 128 and centralized ledger 130. More generally, transaction settlement module 214 may be configured to monitor any suitable transaction parameter (contract expiration, a predetermined time, a predetermined date etc.) associated with transaction data (such as trade data stored in storage 124), which may trigger transfer of digital asset funds between CA accounts 128 of at least one first entity (member) and at least one second entity (member) of system 100. An example transaction settlement process performed by transaction settlement module 214 is described further below with respect to FIG. 4.

Custodian public wallet 216 may be configured to communicate with public ledger computer(s) 112 and member public wallet(s) 220, for the transfer of crypto assets from (offline) CA account(s) 128 to (public/online) public crypto asset accounts (e.g., public wallets), and vice versa. As discussed above, custodian public wallet 216 may operate with offline storage 208, such that custodian public wallet 216 may only temporarily hold crypto asset funds during a pending transfer of the crypto asset funds between (offline) custodian computer 126 and public accounts. Custodian public wallet 216, thus, provide a means for communication with public (online) entities; and the use of custodian public wallet 216 as only temporary storage (with long-time storage via offline storage) reduces security risks to the crypto assets.

Some portions of the above description illustrate exemplary embodiments in terms of algorithms and symbolic representations of operations on information. These algorithmic descriptions and representations are understood by those skilled in the data processing arts to convey the substance of their work effectively to others skilled in the art. These operations, while described functionally, computationally, or logically, are understood to be implemented by data structures, computer programs or equivalent electrical circuits, microcode, or the like. Furthermore, it has also proven convenient at times, to refer to these arrangements of operations as modules, without loss of generality. The described operations and their associated modules may be embodied in specialized software, firmware, specially-configured hardware or any combinations thereof.

Figure 4:
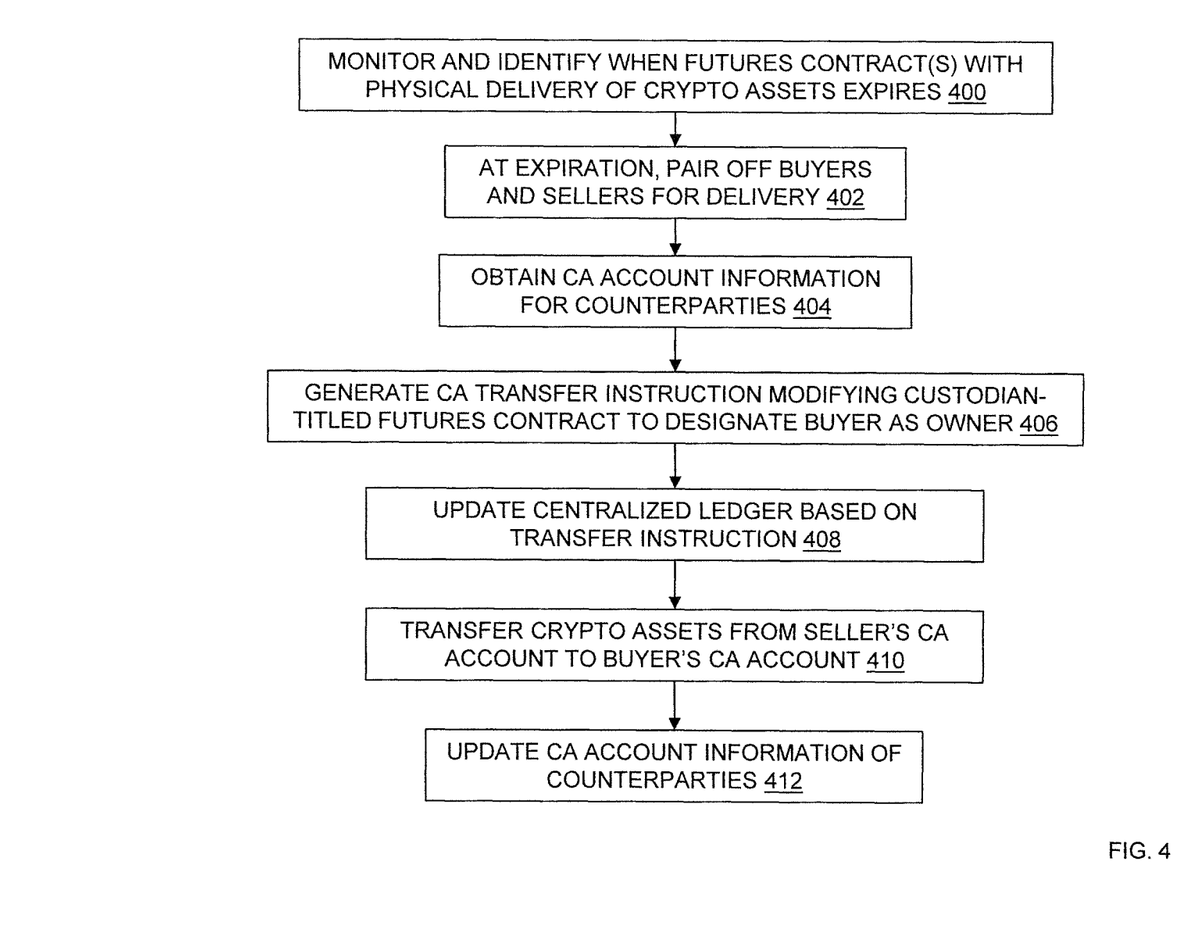
FIG. 4 is a flowchart diagram of an example method for settling crypto asset transactions associated with the data structure management environment shown in FIG. 1, according to an aspect of the present disclosure.

Those skilled in the art will appreciate that system 102 may be configured with more or less modules to conduct the methods described herein with reference to FIGS. 3-5. As illustrated in FIGS. 3-5, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 3-5 may be performed by one or more specialized processing components associated with components 118-134 of data structure management environment 100 of FIGS. 1 and 2. In FIGS. 3-5, it is understood that some of the steps may be performed by data structure management environment 100 concurrently with other steps or a combination of steps, or may be performed in a different sequence than shown.

FIGS. 3 and 4 describe example embodiments of system 102 relating to CAF transactions. FIG. 5 describes an example embodiment of system 102 relating to withdrawal of crypto asset funds from CA account(s) 128 of system 102 to a public account of a member. It is noted that FIGS. 3-5 represent non-limiting examples of system 102, and that system 102 may be used for storing, trading, clearing and settlement of any crypto assets in a wallet-less and offline procedure, to minimize security risks.

FIG. 3 illustrates a flowchart diagram of an example method for registering and permissioning an entity requesting to trade in CAF transactions, in accordance with an embodiment of the present disclosure. At step 300, CA trade controller 212, via entity interface 202, may receive a request to trade from an entity among buyer computer(s) 104, seller computer(s) 106 and MM computer(s) 108 (generally referred to herein as a requesting entity). At step 302, CA trade controller 212, via account data module 204, may determine whether the requesting entity is a member. For example, account data module 204 may query member data storage 132.

If the requesting entity is determined by account data module 204 to be a member, step 302 may proceed to step 316, and CA trade controller 212 may permit the requesting entity to trade in crypto assets (for example, to initiate and participate in CAF transactions). CA trade controller 212, in some examples, may prevent one or more of order book module 118 and matching engine 120 from accepting orders from entities that are not permissioned.

If the requesting entity is determined by account data module 204 to be a non-member, step 302 may proceed to step 304. At step 304, account data module 204 may create a CA account 128 for the requesting entity. At step 306, account data module 204 may store member information for the requesting entity in storage 132. At step 306, account data module 204 may also update any entity relationships in storage 134.

At step 308, account data module 204 may communicate with an (external) account of the requesting entity (e.g., the entity's public wallet 220), via custodian public wallet 216, and transfer at least a portion of the crypto assets in the external account (e.g., the entity's public wallet 220) into CA account 128. The transferred crypto assets is associated with the requesting entity. For example, account data module 204 may cause the crypto assets to be transferred from the entity's public wallet 220 to custodian public wallet 216 (for temporary storage), and then may immediately cause the crypto assets to be transferred from custodian public wallet 216 to offline storage 208 (for long-term secure, offline storage).

At step 310, account data module 204 may assign the title of the transferred crypto assets to a custodian entity associated with custodian computer 126, and may designate the requesting entity as the owner of the transferred crypto assets. At step 312, account data module 204 may communicate with public ledger computer(s) 112, via PLC interface 210, to update public ledger 114 to record the transferred title of the crypto assets. In this manner, custodian computer 126 may prefund the CA account, and may assume a risk of loss of the crypto assets, if the crypto asset information in system 102 is somehow compromised.

In some examples, steps 310 and 312 may be optional. For example, in some embodiments, the title of the crypto assets may remain with the requesting entity, and there may be no need to indicate a change of location of the crypto asset funds in public ledger 114. In other examples where the title may not change, step 310 may be optional, and step 312 may be performed, for example, to indicate the change in funds of the entity's external account, to indicate the updated location of the funds, etc.

At step 314, centralized ledger controller 206 may update centralized ledger 130 based on the titled crypto assets (at step 316) (or, in some examples, based on the transferred crypto assets at step 314). Step 314 may proceed to step 316, and CA trade controller 212 may permit the requesting entity to trade.

The performance of steps 308-314, prior to permissioning the requesting entity, guarantees that the physical commodity is delivered to custodian computer 126, prior to trading. Steps 308-314, thus, prevent seller computer(s) 106 (for example) from participating in transactions unless custodian computer first obtains the physical commodity. Steps 308-314 may also limit a seller's ability to sell (e.g., via seller computer(s) 106) to the physical commodity stored in the associated CA account 128.

Although FIG. 3 illustrates a registration and permissioning process, steps 308-314 also represent a deposit process, for depositing crypto asset funds into CA account(s). Thus, in some examples, account data module 204 may receive a request to deposit crypto asset funds from a public member account (such as public wallet(s) 220), and may perform steps 308-314 responsive to the request, thereby performing a crypto asset deposit process.

FIG. 4 illustrates a flowchart diagram of an example method for settling CAF transactions, in accordance with an embodiment of the present disclosure. At step 400, transaction settlement module 214 may monitor and identify when one or more CAF contracts (stored in trade data storage 124) expires. At step 402, transaction settlement module 214 may, at expiration, pair off buyers and sellers among the trade data (in storage 124) for delivery. In one example embodiment, the CAF contracts may be daily contracts with physical delivery each day. Thus, the expiration time may be one day. It is understood that the contract expiration time may be any suitable time period, including, but not limited to daily, hourly, weekly, monthly, etc.

At step 404, account data module 204 may obtain CA account information for counterparties (e.g., the paired off buyers and sellers in step 402), via member data and entity relationship(s) in storages 132 and 134. At step 406, transaction settlement module 214 may generate a CA transfer instruction. The instruction may modify the futures contract (titled to the custodian entity) to transfer the ownership, by designating the buyer as the owner of the contract.

At step 408, CL controller 206 may update centralized ledger 130 to record the transaction based on the transfer instruction (step 406). At step 410, account data module 204 may transfer crypto assets associated with the transaction from the seller's CA account to the buyer's CA account. At step 412, account data module 204 may update CA account information, as well as any member data and/or entity relationships (in storages 132, 134) of the buyer and seller.

FIG. 5 illustrates a flowchart diagram of an example method for withdrawal of crypto asset funds from CA account(s) 128 of system 102 to a public account of a member, in accordance with an embodiment of the present disclosure. At step 500, account data module 204, via entity interface 202, may receive a request from a (registered) member (i.e., a member having an account among CA account(s) 128) to withdraw an amount of crypto assets from the associated CA account 128. At step 502, account data module 204 may query the associated CA account 128, to verify whether the withdrawal amount is available in the associated CA account 128 of the requesting member. Step 502 may proceed to step 504.

If, at step 504, the requested withdrawal amount is not verified by account data module 204, step 504 proceeds to step 506, and account data module 204 may deny the withdrawal request.

If the requested withdrawal amount, at step 504, is verified, step 504 may proceed to step 508. At step 508, account data module 204 may retrieve public wallet information for the requesting member, for example, by querying member data storage 132. At step 510, account data module 204 may generate a CA transfer instruction transferring the title of crypto assets from the custodian entity to the requesting member, to transfer ownership of the crypto assets to the requesting member.

At step 512, account data module 204 may transfer the withdrawal amount from the associated CA account 128 (in offline storage 208) to custodian pubic wallet 216 (for temporary storage during the pending transfer). At step 514, account data module 204 may transfer the withdrawal amount from custodian public wallet 216 to the requesting member's public wallet 220, based on the retrieved member public wallet information (step 508). At step 516, account data module 204 may update CA account information of the associated CA account 128, based on the withdrawn (and transferred) amount of crypto assets.

At step 518, CL controller 206 may update centralized ledger 130 based on the transfer instruction (step 510). At step 520, account data module 204 may confirm the transfer of the withdrawal amount to the member public wallet 220 (in step 512) by accessing public ledger 114.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It will be understood by those of ordinary skill that those terms used herein are interchangeable, and any special purpose computer capable of performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with data structure management systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 6:
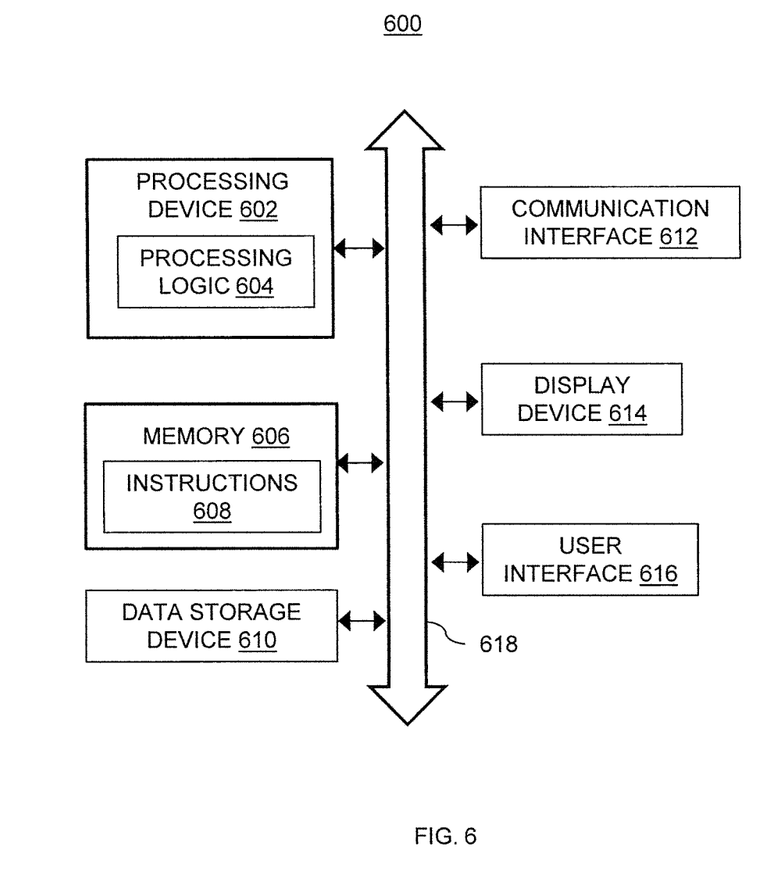
FIG. 6 is a functional block diagram of an example computer system, according to an aspect of the present disclosure.

FIG. 6 illustrates a functional block diagram of a machine in the example form of computer system 600 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein.

In some examples, offline custodian system 102, buyer computer(s) 104, seller computer(s) 106, market maker computer(s) 108, public ledger computer(s) 112 (FIG. 1) and/or custodian computer 126 (FIG. 2) may be implemented by the example machine shown in FIG. 6 (or a combination of two or more of such machines).

Example computer system 600 may include processing device 602, memory 606, data storage device 610 and communication interface 612, which may communicate with each other via data and control bus 618. In some examples, computer system 600 may also include display device 614 and/or user interface 616.

Processing device 602 may include, without being limited to, a microprocessor, a central processing unit, an application specific integrated circuit (ASIC), a field programmable gate array (FPGA), a digital signal processor (DSP) and/or a network processor. Processing device 602 may be configured to execute processing logic 604 for performing the operations described herein. In general, processing device 602 may include any suitable special-purpose processing device specially programmed with processing logic 604 to perform the operations described herein.

Memory 606 may include, for example, without being limited to, at least one of a read-only memory (ROM), a random access memory (RAM), a flash memory, a dynamic RAM (DRAM) and a static RAM (SRAM), storing computer-readable instructions 608 executable by processing device 602. In general, memory 606 may include any suitable non-transitory computer readable storage medium storing computer-readable instructions 608 executable by processing device 602 for performing the operations described herein. Although one memory device 606 is illustrated in FIG. 6, in some examples, computer system 600 may include two or more memory devices (e.g., dynamic memory and static memory).

Computer system 600 may include communication interface device 612, for direct communication with other computers (including wired and/or wireless communication) and/or for communication with a network. In some examples, computer system 600 may include display device 614 (e.g., a liquid crystal display (LCD), a touch sensitive display, etc.). In some examples, computer system 600 may include user interface 616 (e.g., an alphanumeric input device, a cursor control device, etc.).

In some examples, computer system 600 may include data storage device 610 storing instructions (e.g., software) for performing any one or more of the functions described herein. Data storage device 610 may include any suitable non-transitory computer-readable storage medium, including, without being limited to, solid-state memories, optical media and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A private custodian system for secure digital asset transactions comprising:
a custodian computer configured to communicate with a first entity computer via a first dedicated interface coupled to a first communications network and communicate with a public ledger via a second dedicated interface coupled to a second communications network;
a storage device within the custodian computer that is inaccessible by the first communications network and the second communications network; and
a private centralized ledger, the private centralized ledger comprising a repository within the private custodian system that is accessible by the custodian computer but inaccessible by the first communications network and the second communications network;
the custodian computer configured to:
receive, via the first dedicated interface, a request to trade digital assets from the first entity computer,
determine that the first entity computer is not a registered member of the private custodian system,
create a first digital asset account associated with the first entity computer, the first digital asset account stored in the storage device,
transfer, via the second dedicated interface, the digital assets from an external public wallet associated with the first entity computer on the public ledger to a public custodian wallet within the private custodian system for temporary storage, the second dedicated interface configured to communicate with the public ledger only for a duration of the transfer,
transfer the digital assets from the public custodian wallet to the first digital asset account for secure offline storage,
transfer a title of the digital assets to a custodian entity associated with the custodian computer and designating a first entity associated with the first entity computer as an owner of the digital assets,
update the private centralized ledger to include the transferred title and a designation of ownership of the digital assets,
update, via the second dedicated interface, the public ledger to record the transferred title of the digital assets, the second dedicated interface configured to communicate with the public ledger only for a duration of the update,
receive transaction data from the first entity computer via the first dedicated interface, the transaction data being associated with the digital assets,
monitor at least one transaction parameter associated with the received transaction data,
generate a transfer instruction that remains within the private custodian system and isolated from the public ledger, the transfer instruction indicating a transfer of a first portion of the digital assets from the first digital asset account to a second digital asset account associated with a second entity computer, the second digital asset account stored in the storage device,
update the private centralized ledger, responsive to the transfer instruction, without communication to the public ledger, to indicate the transfer of the first portion of the digital assets, and
transfer the first portion of digital assets between the first digital asset account and the second digital asset account responsive to the transfer instruction.

2. The private custodian system of claim 1, wherein the custodian computer is further configured to:
receive, via the first dedicated interface, a request from the first entity computer to withdraw a second portion of the digital assets from the private custodian system;
determine that the second portion of the digital assets is available in the first digital asset account;
retrieve information about the external public wallet associated with the first entity computer;
generate a transfer instruction that remains within the private custodian system and isolated from the public ledger;
update the private centralized ledger based on the transfer instruction without communication to the public ledger, the update comprising modifying the second portion of the digital assets to transfer the title from the custodian entity to the first entity to thereby change the ownership to the first entity;
transfer the second portion of the digital assets from the first digital asset account to the public custodian wallet for temporary storage; and
transfer, via the second dedicated interface, the second portion of the digital assets to the external public wallet associated with the first entity computer, the second dedicated interface configured to communicate with the public ledger only for a duration of the transfer.

3. The private custodian system of claim 1, wherein the digital assets comprise one or more crypto assets.

4. The private custodian system of claim 3, wherein the one or more crypto assets include one or more crypto asset futures contracts.

5. The private custodian system of claim 4, wherein the at least one transaction parameter comprises an expiration of the one or more crypto asset futures contracts.

6. A method for secure digital asset transactions, the method comprising:
receiving, by a custodian computer of a private custodian system, a request to trade digital assets from a first entity computer via a first dedicated interface coupled to a first communications network, the custodian computer configured to communicate with the first entity computer via the first dedicated interface and communicate with a public ledger via a second dedicated interface coupled to a second communications network;
determining, by the custodian computer, that the first entity computer is not a registered member of the private custodian system;
creating, by the custodian computer, a first digital asset account associated with the first entity computer, the first digital asset account stored in a storage device within the custodian computer that is inaccessible by the first communications network and the second communications network;

transferring, by the custodian computer, the digital assets from an external public wallet associated with the first entity computer on the public ledger to a public custodian wallet within the private custodian system for temporary storage via the second dedicated interface coupled to the second communications network, the second dedicated interface configured to communicate with the public ledger only for a duration of the transferring;

transferring, by the custodian computer, the digital assets from the public custodian wallet to the first digital asset account for secure offline storage;

transferring, by the custodian computer, a title of the digital assets to a custodian entity associated with the custodian computer and designating a first entity associated with the first entity computer as an owner of the digital assets;

updating, by the custodian computer, a private centralized ledger to include the transferred title and a designation of ownership of the digital assets, the private centralized ledger comprising a repository within the private custodian system that is accessible by the custodian computer but inaccessible by the first communications network and the second communications network;

updating, by the custodian computer, the public ledger to record the transferred title of the digital assets via the second dedicated interface, the second dedicated interface configured to communicate with the public ledger only for a duration of the updating;

receiving, by the custodian computer, transaction data from the first entity computer via the first dedicated interface, the transaction data being associated with the digital assets;

monitoring, by the custodian computer, at least one transaction parameter associated with the received transaction data;

generating, by the custodian computer, a transfer instruction that remains within the private custodian system and isolated from the public ledger, the transfer instruction indicating a transfer of a first portion of the digital assets from the first digital asset account to a second digital asset account associated with a second entity computer, the second digital asset account stored in the storage device;

updating by the custodian computer, the private centralized ledger, responsive to the transfer instruction, without communication to the public ledger, to indicate the transfer of the first portion of the digital assets; and transferring by the custodian computer, the first portion of the digital assets between the first digital asset account and the second digital asset account responsive to the transfer instruction.

7. A non-transitory computer readable medium configured to store computer-readable instructions executable by at least one processor of one or more computers representing a custodian computer of a private custodian system, the computer-readable instructions, when executed, cause the at least one processor to:

receive, via a first dedicated interface coupled to a first communications network, a request to trade digital assets from a first entity computer, the custodian computer configured to communicate with the first entity computer via the first dedicated interface and communicate with a public ledger via a second dedicated interface coupled to a second communications network;

determine that the first entity computer is not a registered member of the private custodian system;

create a first digital asset account associated with the first entity computer, the first digital asset account stored in a storage device within the custodian computer that is inaccessible by the first communications network and the second communications network;

transfer, via the second dedicated interface coupled to the second communications network, the digital assets from an external public wallet associated with the first entity computer and stored on the public ledger to a public custodian wallet within the private custodian system for temporary storage, the second dedicated interface configured to communicate with the public ledger only for a duration of the transfer;

transfer the digital assets from the public custodian wallet to the first digital asset account for secure offline storage;

transfer a title of the digital assets to a custodian entity associated with the custodian computer and designating a first entity associated with the first entity computer as an owner of the digital assets;

update a private centralized ledger to include the transferred title and a designation of ownership of the digital assets, the private centralized ledger comprising a repository within the private custodian system that is accessible by the custodian computer but inaccessible by the first communications network and the second communications network;

update, via the second dedicated interface, the public ledger to record the transferred title of the digital assets, the second dedicated interface configured to communicate with the public ledger only for a duration of the update;

receive transaction data from the first entity computer via the first dedicated interface, the transaction data being associated with the digital assets;

monitor at least one transaction parameter associated with the received transaction data;

generate a transfer instruction that remains within the private custodian system and isolated from the public ledger, the transfer instruction indicating a transfer of a first portion of the digital assets from the first digital asset account to a second digital asset account associated with a second entity computer, the second digital asset account stored in the storage device;

update the private centralized ledger, responsive to the transfer instruction, without communication to the public ledger, to indicate the transfer of the first portion of the digital assets; and transfer the first portion of the digital assets between the first digital asset account and the second digital asset account responsive to the transfer instruction.

8. The method of claim 6, wherein the digital assets comprise one or more crypto assets.

9. The method of claim 8, wherein the one or more crypto assets include one or more crypto asset futures contracts.

10. The method of claim 9, wherein the at least one transaction parameter comprises an expiration of the one or more crypto asset futures contracts.

11. The non-transitory computer readable medium of claim 7, wherein the digital assets comprise one or more crypto assets.

12. The non-transitory computer readable medium of claim 11, wherein the one or more crypto assets include one or more crypto asset futures contracts.

13. The non-transitory computer readable medium of claim 12, wherein the at least one transaction parameter comprises an expiration of the one or more crypto asset futures contracts.

* * * * *